March 18, 1941.　　　R. R. ROBINSON　　　2,235,301
AUTOMATIC SOUND REPRODUCING MACHINE
Filed Nov. 14, 1939　　　12 Sheets-Sheet 1

Inventor

ROBERT R. ROBINSON,

By

Attorney

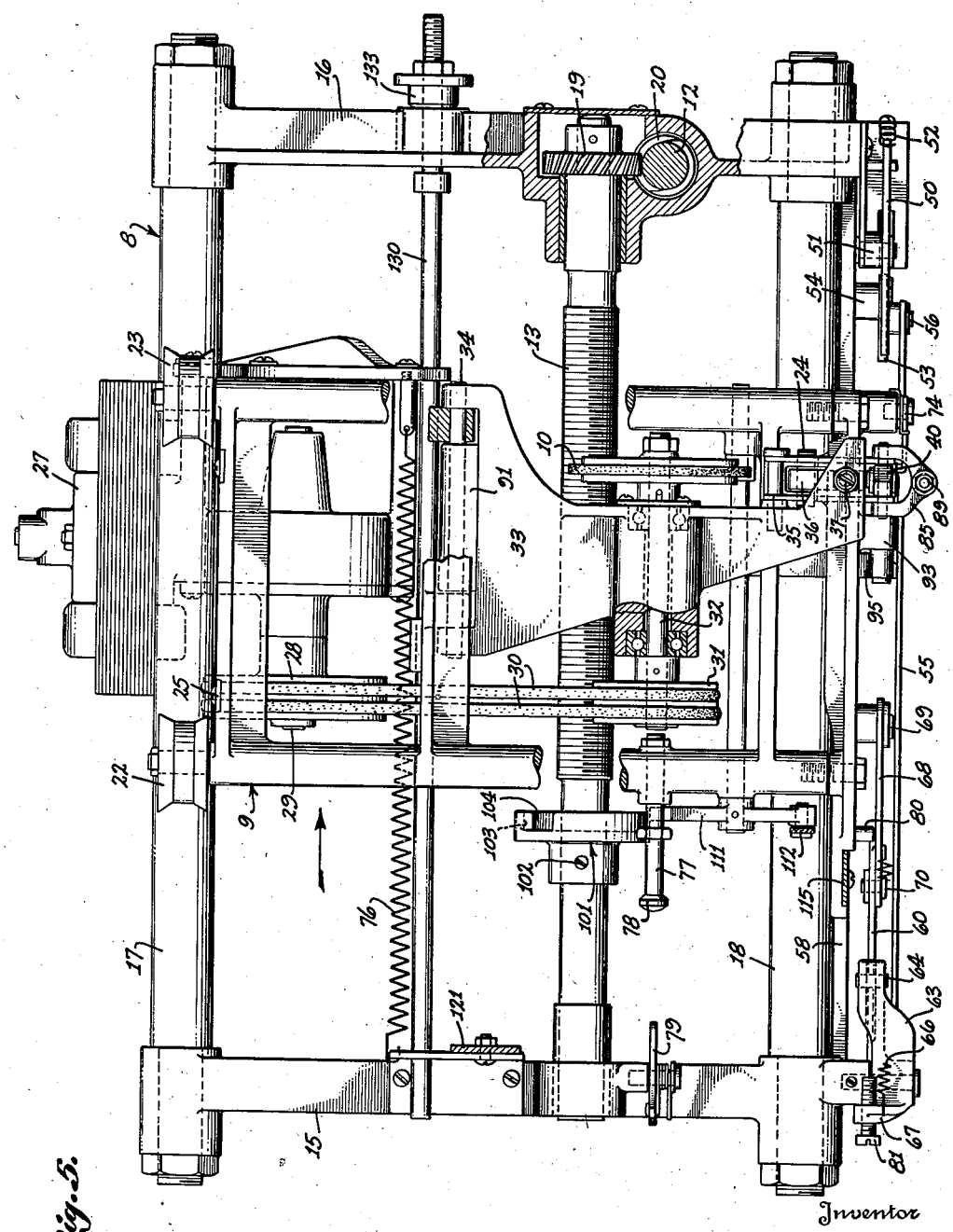

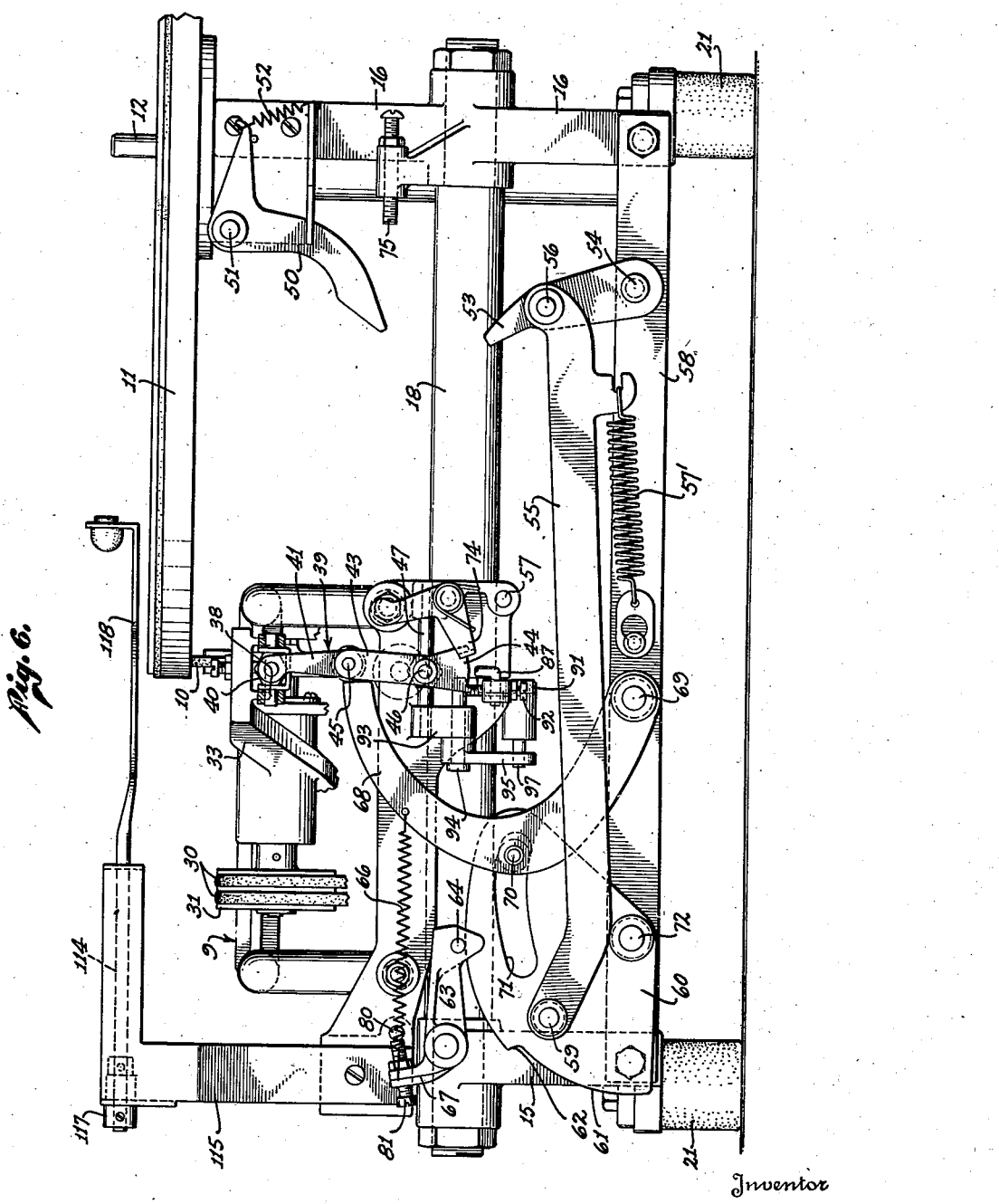

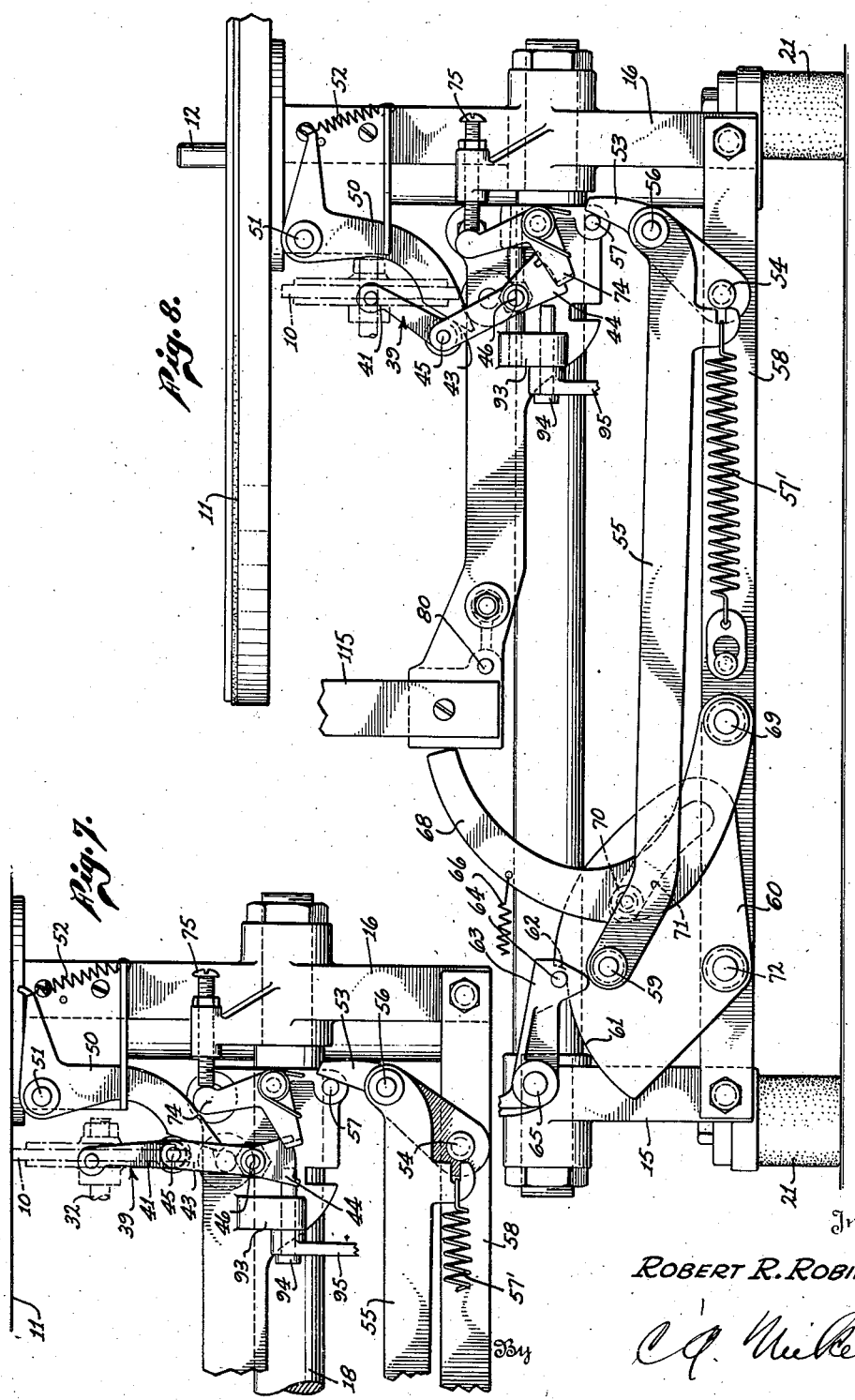

March 18, 1941. R. R. ROBINSON 2,235,301
AUTOMATIC SOUND REPRODUCING MACHINE
Filed Nov. 14, 1939 12 Sheets-Sheet 7

Inventor
ROBERT R. ROBINSON,
By
Attorney

March 18, 1941. R. R. ROBINSON 2,235,301
AUTOMATIC SOUND REPRODUCING MACHINE
Filed Nov. 14, 1939 12 Sheets-Sheet 8

Inventor
ROBERT R. ROBINSON,
By
Attorney

Inventor
ROBERT R. ROBINSON,
Attorney

March 18, 1941. R. R. ROBINSON 2,235,301
AUTOMATIC SOUND REPRODUCING MACHINE
Filed Nov. 14, 1939 12 Sheets-Sheet 10

Inventor
ROBERT R. ROBINSON,
By
Attorney

March 18, 1941. R. R. ROBINSON 2,235,301
AUTOMATIC SOUND REPRODUCING MACHINE
Filed Nov. 14, 1939 12 Sheets-Sheet 11

Inventor
ROBERT R. ROBINSON,
By
Attorney

March 18, 1941.    R. R. ROBINSON    2,235,301
AUTOMATIC SOUND REPRODUCING MACHINE
Filed Nov. 14, 1939    12 Sheets-Sheet 12
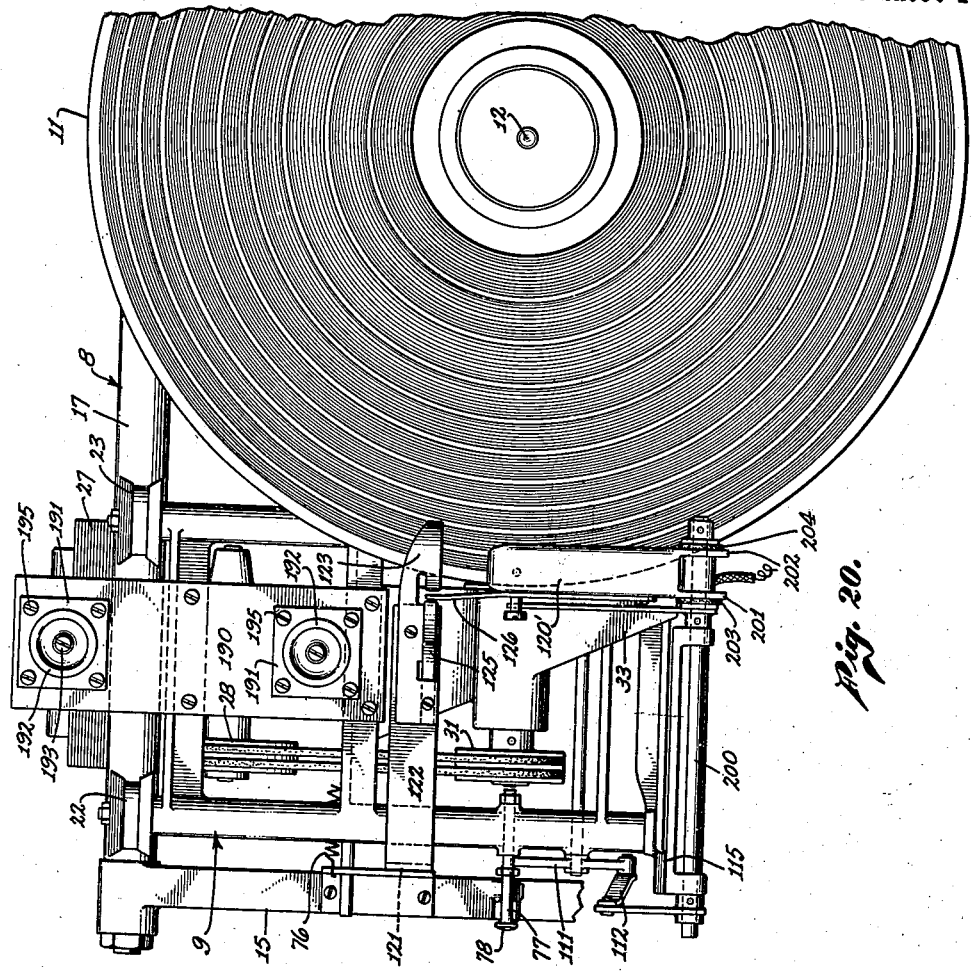
Inventor
ROBERT R. ROBINSON,
By
Attorney Patented Mar. 18, 1941

2,235,301

UNITED STATES PATENT OFFICE 2,235,301

AUTOMATIC SOUND REPRODUCING MACHINE

Robert R. Robinson, Los Angeles, Calif., assignor, by mesne assignments, to George A. Hormel, Beverly Hills, Calif.

Application November 14, 1939, Serial No. 304,343

17 Claims. (Cl. 274—15)

The present invention relates to machines for the reproduction of sound and is particularly directed toward an automatic machine whereby one or any desired number of consecutive recordings can be reproduced from a record carrying a plurality of consecutive recordings in series on one face thereof. The invention also contemplates a machine of this character which is capable of being controlled by the insertion of coins and which will automatically reset itself to replay the recordings after the last of the series has been reproduced. Moreover, the invention pertains to numerous improvements, combinations and arrangements of elements whereby absolute accuracy, fidelity and dependability in operation is attained.

Heretofore the reproduction of music, songs, skits and other entertainment from records carried upon discs, cylinders or the like, has involved large machines which were expensive to build and which occupied considerable amount of space. At present, machines are available for playing any one of a number of separate records, such machines being coin actuated. The present invention, however, is directed to a very compact small unit which instead of employing a plurality of sound records employs a single disc record, one surface thereof carrying a consecutive series of recordings. Moreover, in the preferred embodiment of the invention the record used in the machine of this invention differs from the phonograph records now in use in that the sound recordings carried by such record are reproducible at a varying rotational speed of the disc and at constant groove or recording speed. In the usual form of phonograph disc record the disc is driven at a constant number of revolutions per minute. As the tone arm or needle moves from the outer edge toward the center of the record, the linear speed or groove speed varies, the needle traversing a much greater length of groove at the edge areas of the record than in those areas adjacent the rotational center of the record. In the machine of the present invention the disc is rotated at a relatively slow speed when the tone arm is adjacent the edge areas and the speed of rotation increases as the tone arm reaches the rotational center so that the actual linear speed is substantially uniform and constant throughout the record.

The present invention, generally stated, therefore, pertains to a machine of novel construction whereby any one or more of a series of consecutive recordings carried upon a record may be reproduced, the reproduction being automatic upon the insertion and actuation of a coin slot. Means are provided for positively terminating the reproduction at the end of a sound recording, for initiating reproduction immediately upon actuation of the coin slot, for correctly varying the speed of rotation of the turn-table, for eliminating vibration and extraneous noises from the reproducing apparatus, means for automatically resetting the device after it reaches its limit of travel in one direction, and means for positively and automatically initiating a subsequent reproduction after resetting in precisely timed relation to the recordings carried by the disc so that no portion of a recording is overlooked or skipped. The apparatus of this invention is extremely accurate and positive in its action and thereby permits the use of record discs containing recording grooves at a much closer spacing than the spacing ordinarily employed in commercial phonograph records. By the use of very close spacing and a large number of lines per radial inch on the disc, as many as twelve consecutive and separate tunes or recordings may be carried on an ordinary ten inch diameter disc, each of said recordings having a playing time of say one and one-half to three minutes.

An object of the present invention, therefore, is to provide a device particularly adapted for use as an entertainment device in homes, cafes, waiting rooms, restaurants and the like which is compact, foolproof and accurate and which permits the reproduction of any one or more of a number of sound recordings carried upon one surface only of a record.

A further object is to disclose and provide novel arrangements and combinations of elements whereby devices of the character stated may be readily and economically constructed.

Other objects, advantages, uses and adaptations of the invention will become apparent to those skilled in the art from the following detailed description of one preferred and illustrative embodiment of the invention. In order to facilitate understanding, reference will be had to the appended drawings, in which:

Fig. 5 is an enlarged plan view of the frame and carriage, the turn-table being removed.

Fig. 6 is a front elevation of the frame and motor carriage showing the arrangement of elements at the beginning of operations at the outer edges of a disc record.

Fig. 7 is a front elevation of a portion of the mechanism at the inner limit of travel of the carriage.

Fig. 8 is a front elevation showing the arrangement of elements at the initiation of the return of the carriage to its initial starting position.

Figure 17:
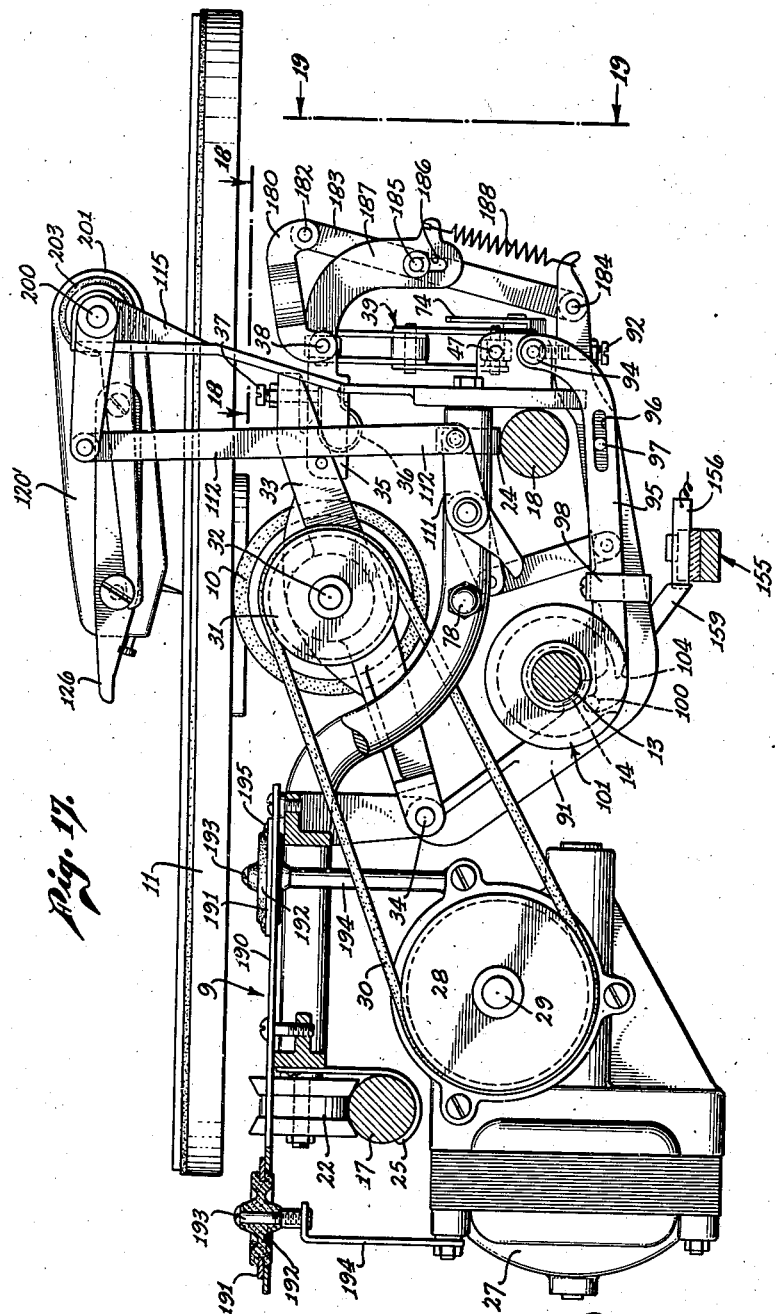
Fig. 17 is a vertical section through a slightly modified form of device.

Figs. 18 and 19 are enlarged horizontal and vertical views respectively taken along planes 18—18 and 19—19 of Fig. 17.

Fig. 20 is a plan view of a portion of the modified form of device.

Figure 1:
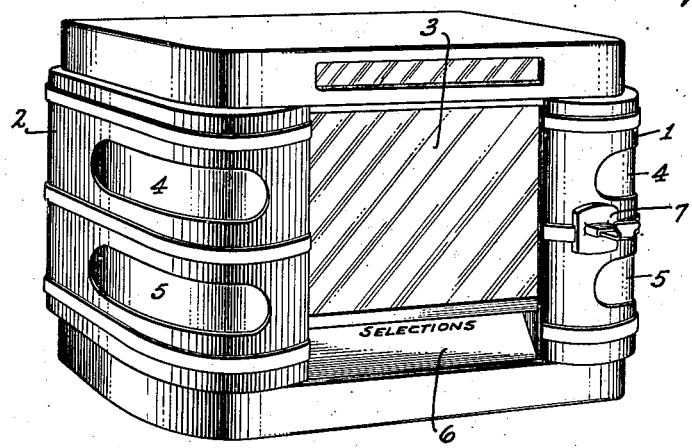
Fig. 1 is a perspective view of the device within a suitable housing.
Figure 15:
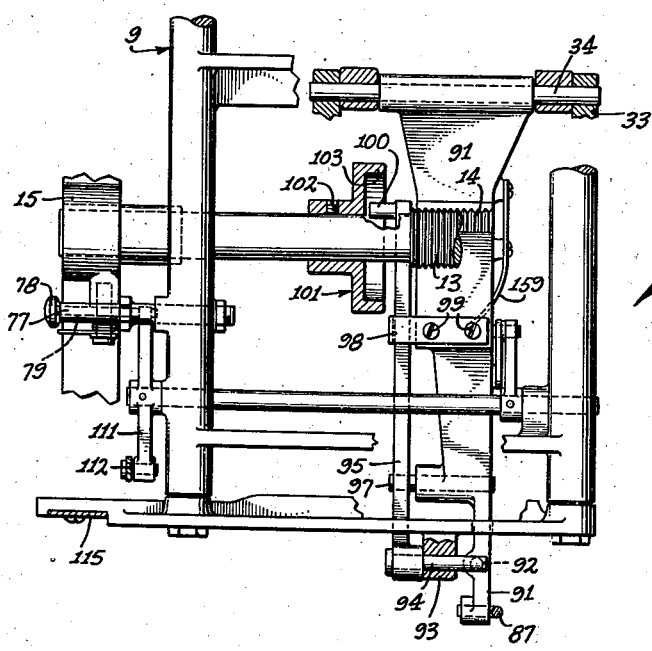
Fig. 15 is a horizontal section taken along the plane 15—15 of Fig. 14.

The form of apparatus shown in Fig. 1 includes a housing having side panels 1 and 2, a base and a top. The front panel, indicated at 3, as well as the side openings 4, 5, etc., may be made of translucent material and suitably illuminated from within the housing. The front panel 3 may carry advertising matter and may include an illuminated selection list, indicated at 6. The coin slot is indicated generally at 7. The entire device may be mounted either upon a table, counter or suitable pedestal.

The arrangement within the housing may be understood most readily by an examination of Figs. 2, 5, 6 and 11. The major elements comprise a frame 8, a motor carriage 9 including a friction drive disc 10, the turn-table 11 mounted upon the shaft 12, and the lead screw 13. The motor carriage includes a lead nut 14 (best seen in Figs. 13 and 14) by means of which the carriage may be releasably connected to the lead screw 13. In brief, the motor carriage with its motor drives the drive disc 10 which, when in contact with the under side of the turn-table 11, rotates the same and its associated shaft 12. The shaft 12 is geared to the lead screw 13 so that the lead screw 13 rotates. As such lead screw rotates, it imparts radial movement to the carriage 9 through the lead nut 14. As a result, the motor carriage drives the turn-table and the turn-table causes the motor carriage to move radially from an outer limit of travel near the edge of the turn-table to a point adjacent the rotational center or shaft 12 of the turn-table. Variable rotational speed is thus imparted to the turn-table.

The frame, generally indicated at 8, may comprise end castings 15 and 16 connected together by means of parallel guide rods 17 and 18 which are parallel to the lead screw 13. The lead screw 13 is journaled in the end castings 15 and 16 and may be provided with a spiral gear 19 adapted to merge with a worm 20 carried by the shaft 12 of the turn-table. The entire frame is suitably supported within the housing upon shock-absorbing supports, generally indicated at 21 in Fig. 6.

The motor carriage 9 is guidingly supported upon the rods 17 and 18 as by means of the rollers 22 and 23 which rest upon the guide rod 17 and the roller 24 which runs on the surface of guide rod 18. Means may be provided for retaining the carriage in position upon such guide rods such as, for example, the hook members 25 and 26 which are attached to the carriage and which slidingly contact the lower surfaces of the guide rails 17 and 18. A motor 27 is suspended from the carriage 9, said motor preferably depending below the guide rods so as to impart a low center of gravity to the carriage. The motor drives a pulley 28 mounted upon shaft 29 and a flexible driving connection such as the belts 30, transmits power to a pulley 31 mounted upon a shaft 32 journaled in a lever arm 33. The shaft 32 also carries the friction drive disc 10. The lever arm 33 is pivotally connected to the carriage as at 34 and the free end of such lever arm is suitably supported from the carriage.

In the embodiment shown in the drawings, an auxiliary lever 35 is pivotally attached near the end of the lever arm 33 and an adjustable spring connection is made between the auxiliary lever and the lever arm, such spring connection including the spring 36 and the adjustable stop 37. One end of the spring 36 is connected to the auxiliary lever 34 whereas the other end abuts against the stop 37 which is held by the free end of the lever arm 33.

The auxiliary lever 35 is yoke-like in form and a horizontal pin 38 extends therethrough. The pin 38 passes through the upper end of a toggle, generally indicated at 39, which as shown may include the hexagonal nut 40 at its upper end, such nut being pivoted upon the pin 38. Upper toggle links are indicated at 41 and the lower links at 42 and 43. The lower link 43 is extended so as to form a toggle latch member 44. The upper toggle links 41 and the lower toggle links 42 and 43 are pivotally connected as at 45. The lower links 42 and 43 are pivotally connected as at 46 to a hex nut which then pivots upon a pin 47 at right angles to the pin 46. In this manner rocking or pivotal connections are established between the toggle 39 and the auxiliary lever arm 35 as well as the carriage 9, the pin 47 being suitably held in a lower portion of the carriage.

At this point it will be noted that in the event the toggle 39 is broken, the auxiliary lever arm 35 will be pulled down. The spring 36 will still tend to move the lever arm 33 upwardly but with only a small amount of pressure and depending upon the adjustment 37 the spring 36 may or may not cause the lever arm 33 to move downwardly so as to disengage the drive disc 10 from the under side of the turn-table 11. Moreover, when the toggle 37 is broken, some pivotal action takes place on the pins 38 and 47.

The position of the elements at the initiation of a series of reproductions is illustrated in Fig. 6. As the motor carriage 9 moves toward the center of the turn-table and the shaft 12, the elements assume the position illustrated in Fig. 7. It will be noted that the end casting 16 carries a toggle trip lever 50 in the form of a bell crank pivoted as at 51 and yieldably urged outwardly against the approaching toggle 39 by means of a spring 52. This toggle trip lever 50 becomes spring-loaded and at the same time the movement of the carriage engages the finger 53 pivoted at 54, said finger being connected to a cam operating link 55. The finger 53 is pivotally connected to the link 55 as at 56 and the pin 57 of the movable carriage moves the finger 53 against the action of a loading spring 57' connecting the link 55 with a stationary bar or member 58 connecting the end castings 15 and 16.

The cam operating link 55 is pivotally connected as at 59 to a setting cam 60 which may be in the form of a sector provided with a depressed edge portion 61 and a shoulder 62. A cam latch 63 provided with a pin 64 is pivotally connected to the frame or end casting 15 as at 65 and when the finger 53 moves the cam operating link 55 toward the right, the cam latch 63 locks the setting cam in position as shown in Fig. 8.

A spring 66 may facilitate the movement of the cam latch, such spring 66 connecting the short arm 67 of the cam latch with a setting lever 68, such setting lever being substantially curved or semi-circular and pivotally connected to the member 58 as indicated at 69. The setting lever 68 is provided with a roller or pin 70 extending into a slot 71 formed in the setting cam 60. The slot 71 is angularly related to the pivot 72 of the setting cam so that movement of the setting cam 60 will cause pivotal movement of the setting lever 68 about its pivotal point 69.

The toggle latch 44 is normally locked in position by means of a bell crank 74 pivotally carried by the motor carriage 9, the bell crank 74 having a lug engaging with a slot formed in the lower edge of the toggle latch 44. As the motor carriage 9 moves toward the center of the turn-table, the upper or free end of the bell crank member 74 contacts with an adjustable stop 75 mounted in the end casting 16 and continued motion toward the center of the turn-table causes the bell crank lever 74 to move so as to release the toggle latch 44 whereupon the toggle trip lever 50 acts to break the toggle 39 under the influence of the spring 52, the parts then assuming the position illustrated in Fig. 8. The bell crank lever 74 is provided with a light spring yieldably urging the same against the end of the toggle latch 44. As soon as the toggle 39 is broken, the lead nut 14 is disengaged from the lead screw 13 and the carriage is returned to its original position at the other side of the frame under the influence of a spring 76 connecting the motor carriage with the end frame 15 as best shown in Fig. 5.

Figure 10:
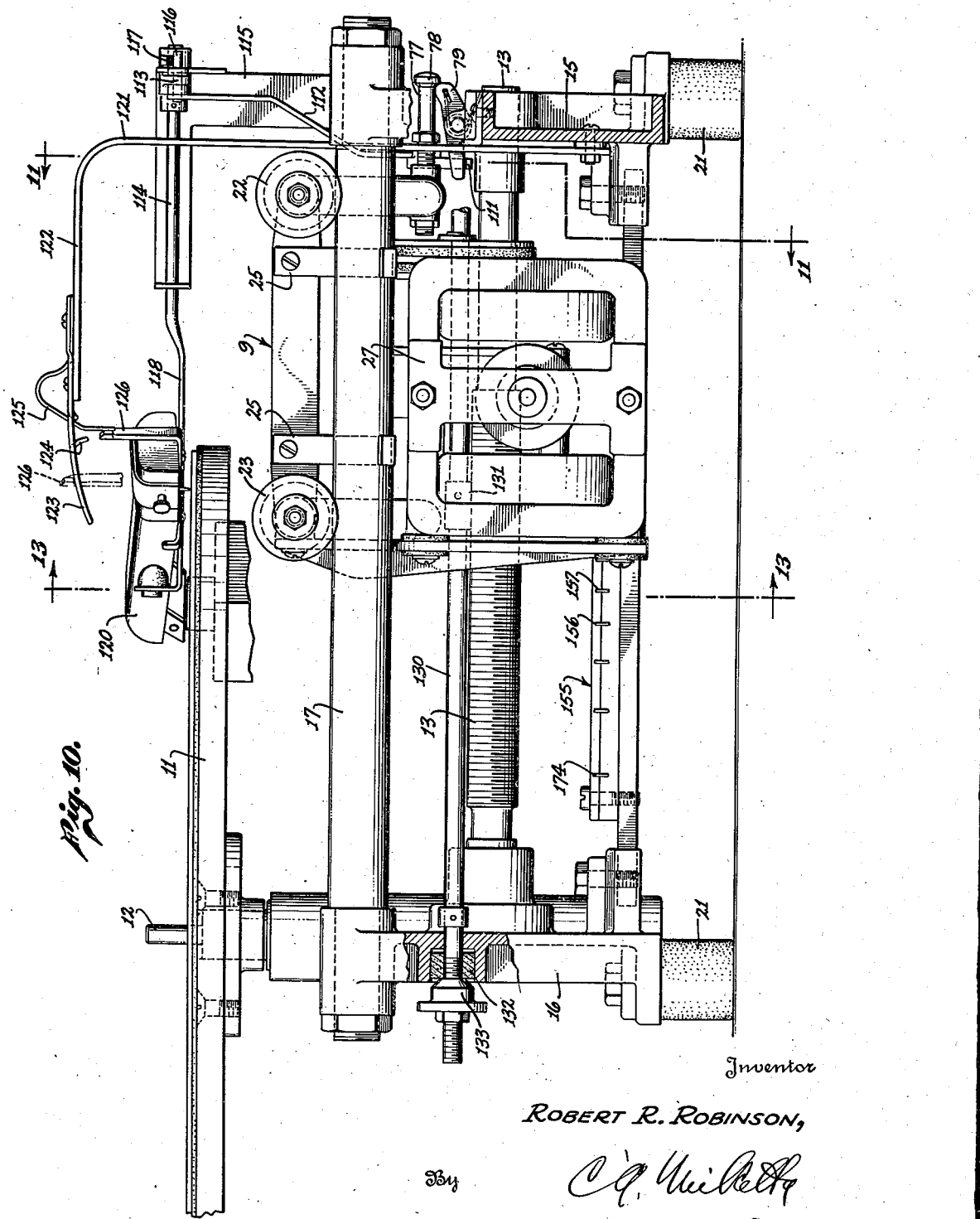
Fig. 10 is the rear of the device in elevation.

By referring to Figs. 5 and 10 it will be noted that means are provided for holding the motor carriage in position after it returns to the outer limit of travel. Such means may include the carriage stop pin 77 provided with a head 78, said head being adapted to engage a latch 79 carried by the end frame 15, the latch 79 being provided with a spring yieldably urging the same upwardly into engagement with the stop pin 77. As the carriage stop pin engages the latch 79, a trip pin 80 on the motor carriage 9 contacts the adjustable stop 81 carried by the short arm 67 of the cam latch 63, thereby raising the cam latch and the pin 64 from the depression 61 and shoulder 62 of the setting cam 60. The spring 57' then urges the cam operating link 55 toward the left, from the position shown in Fig. 8 to the position shown in Fig. 6, this movement causing the setting lever 68 to rise and reset the toggle 39. The blow of the setting lever against the toggle 39 does not move the carriage 9 since such carriage is retained in position by means of the carriage stop pin 77 and latch 79. As soon as the toggle 39 is reset, the device is again in the position illustrated in Fig. 6 and is ready to repeat a series of consecutive reproductions. The release of the carriage stop pin and latch will be described hereinafter.

By now referring to Figs. 5, 6, 11, 13 and 14, the relationship between the movements of the toggle and the engagement of the motor carriage with the lead screw 13 will become apparent. As shown in these figures, the auxiliary lever 35 is provided with a bifurcated end portion or yoke (most clearly shown in Fig. 2) and indicated at 85, such yoke including a collar 86. Extending through this collar 86 is a connecting link 87 provided with a stop 88 abutting the sleeve 86. The upper end of the link 87 may be provided with a head 89 and a spring 90 yieldably urges the link 87 and the stop 88 upwardly. The bottom of the link 87 is pivotally connected to a lead nut lever 91 which carries the lead nut 14, the lead nut lever 91 being pivotally connected to the motor carriage 9. Whenever the toggle 39 is broken, therefore, the downward motion of the toggle and of the auxiliary lever 35 to which the upper end of the toggle is attached, will move the link 87 downwardly, such downward motion pivoting the lead nut lever 91 so as to disengage the lead nut 14 from the lead screw 13. Upward motion of the lead nut lever 91 may be limited in any suitable manner as, for example, by means of an adjustable stop 92. A downwardly extending boss 93 of the motor carriage 9 may carry a pin 94 against which the adjustable stop 92 may rest. The pin 94 may also act as a pivot pin for a control lever 95, such control lever 95 being provided with a slot 96, a pin 97 extending from the nut lever 91 through the slot 96 (see Figs. 11, 13, 14, 15). A guide strap 98 may be attached to the lever arm 91 as by means of the screws 99 and slidably embrace the control lever 95 in order to prevent the control lever 95 from binding. The end of the control lever 95 may be provided with a roller or pin 100.

Mounted upon the lead screw 13 is a control cam 101, said control cam being held onto the lead screw shaft as by means of a set screw 102. Although the control cam may assume different forms, in the drawings it is shown provided with a cylindrical flange 103 having an opening 104 therein. The roller 100 of the control cam 95 may ride on the external surface of the cylindrical portion 103 or may move inwardly through the opening 104. As long as the pin 100 of the control lever 105 is riding on the outside of the cylindrical portion 103 of the control cam 101, the lead nut lever 91 is depressed by reason of the slot and pin connection 96, 97 and the lead nut 14 is disengaged from the lead screw 13. The control cam 101 constitutes control means for holding the lead nut out of engagement with the lead screw until the latter reaches a predetermined and desired position. For this reason the relationship of the opening 104 of the control cam 101 to the lead screw 13 is very important.

Figure 11:
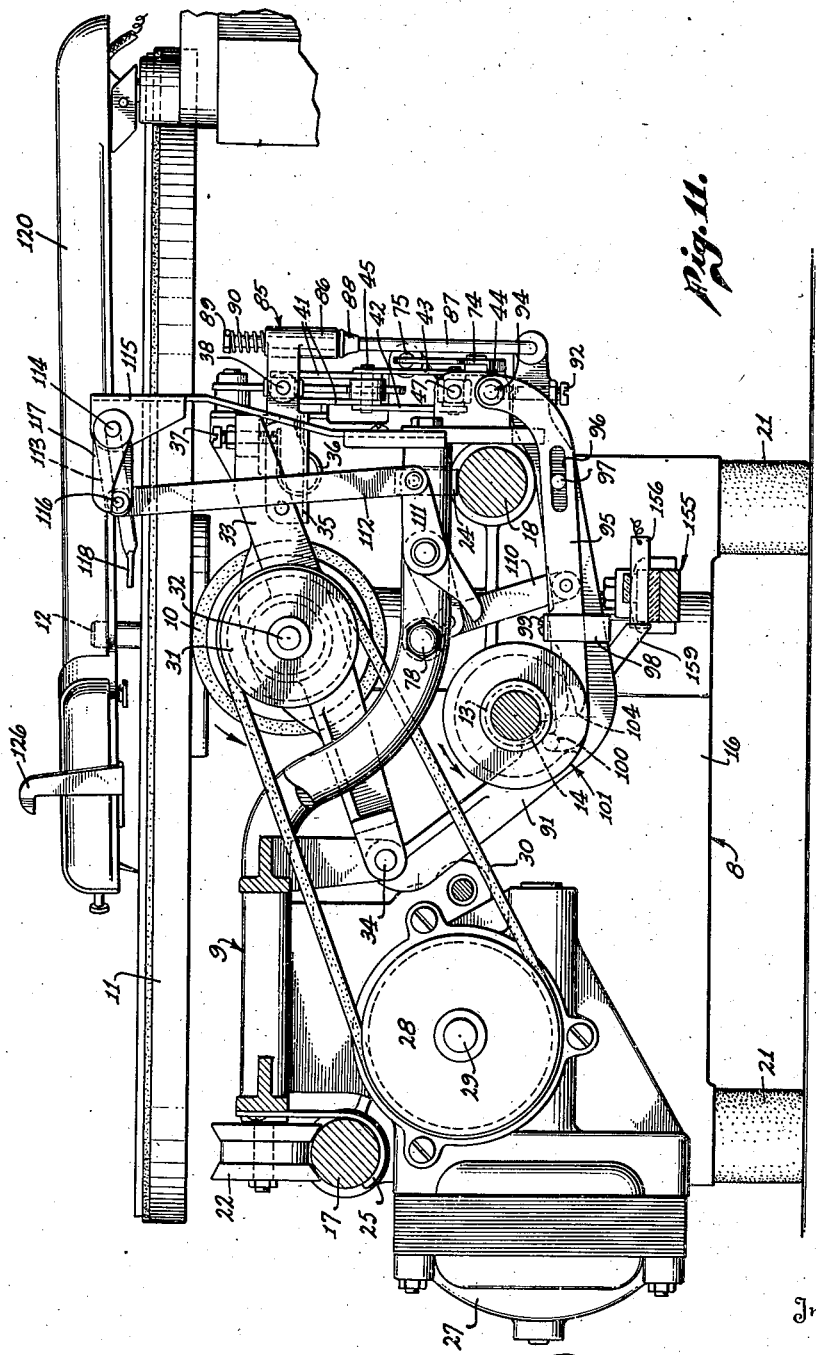
Fig. 11 is a vertical section taken along the plane 11—11 of Fig. 10.
Figure 12:
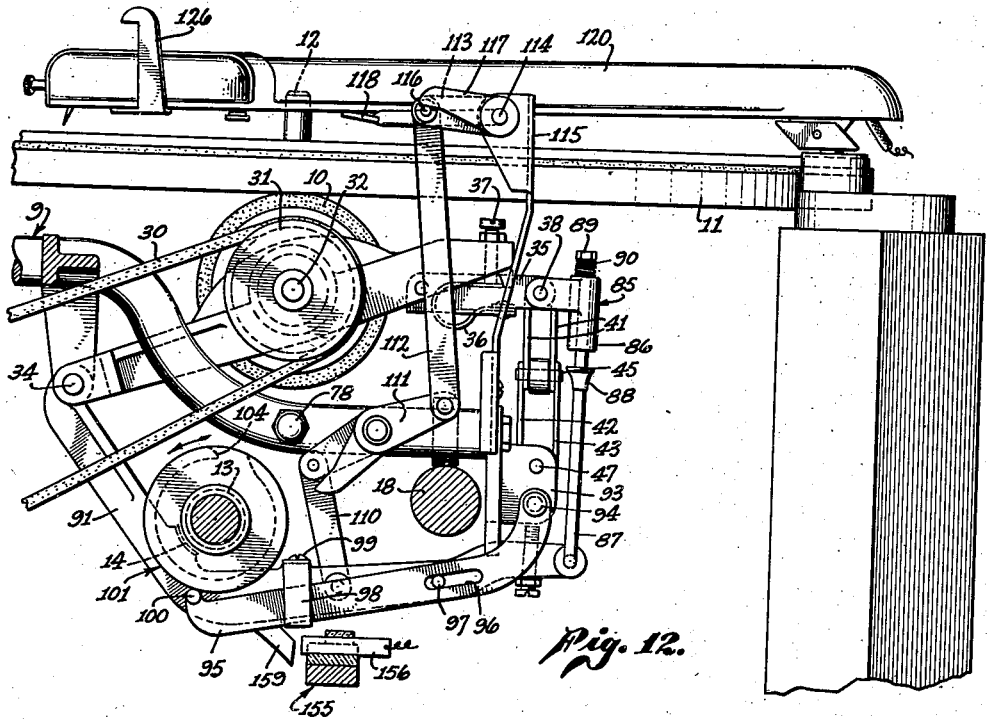
Fig. 12 is a transverse section similar to that shown in Fig. 11 but illustrating the action of the control cam.
Figure 13:
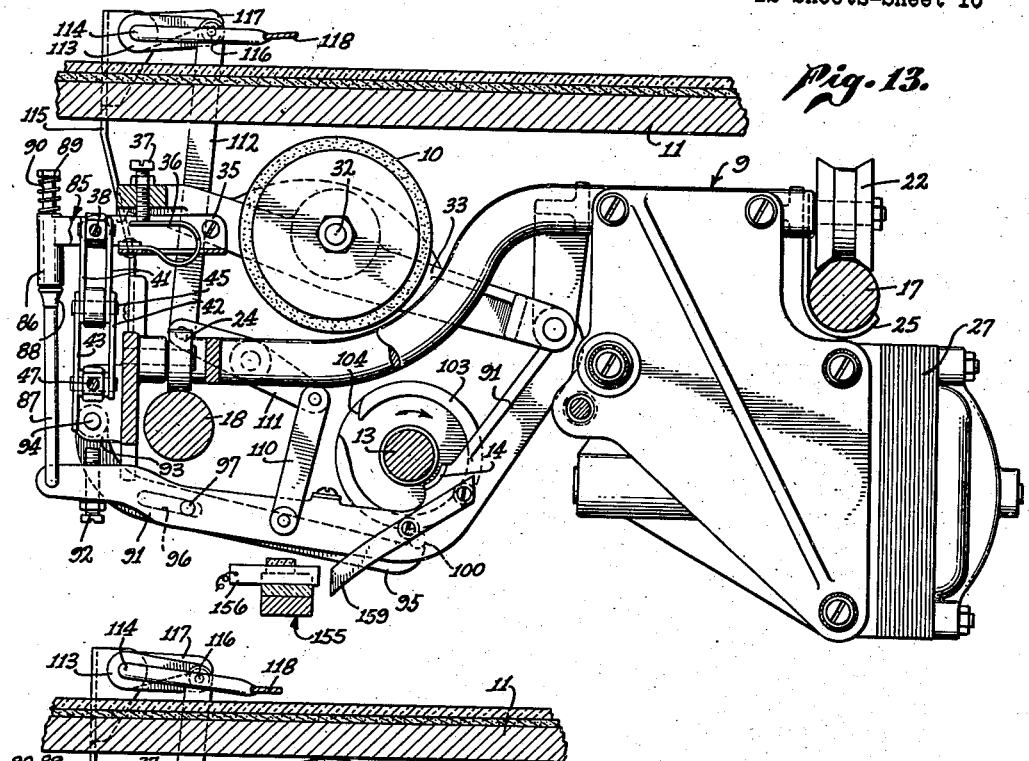
Fig. 13 is a vertical transverse section taken along the plane 13—13 of Fig. 10.
Figure 14:
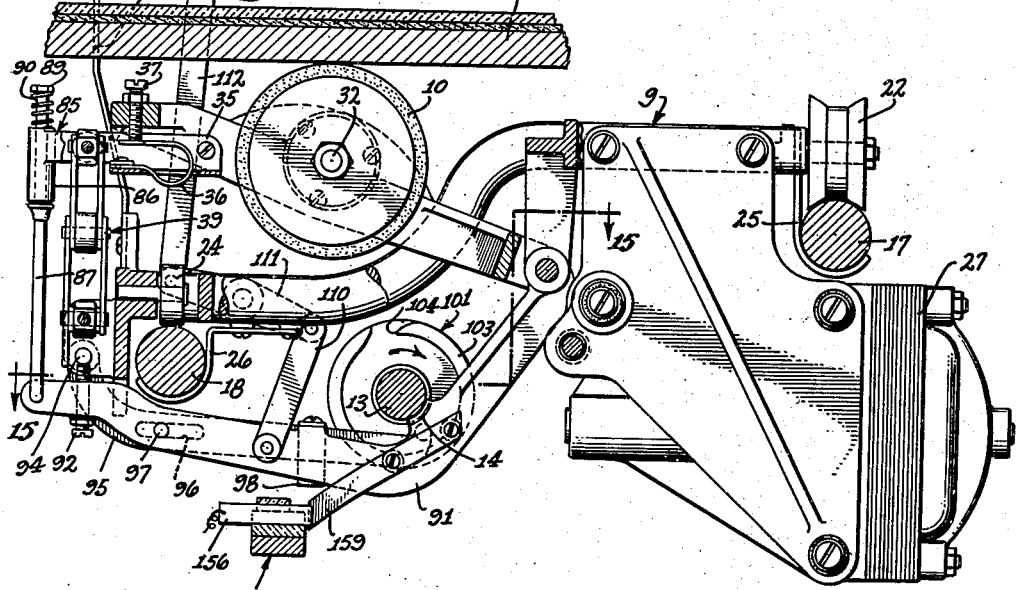
Fig. 14 is a similar section illustrating another position of the elements.

By examining Fig. 13 it will be seen that the roller 100 on the control lever 95 is riding on the outside cylindrical surface 103 of the control cam 101. The lead nut 14 is disengaged from the lead screw 13. In Figs. 11 and 14 the roller 100 of the control lever 95 is within the cylindrical flange 103 and the lead nut 14 is in engagement with the lead screw 13.

Figure 9:
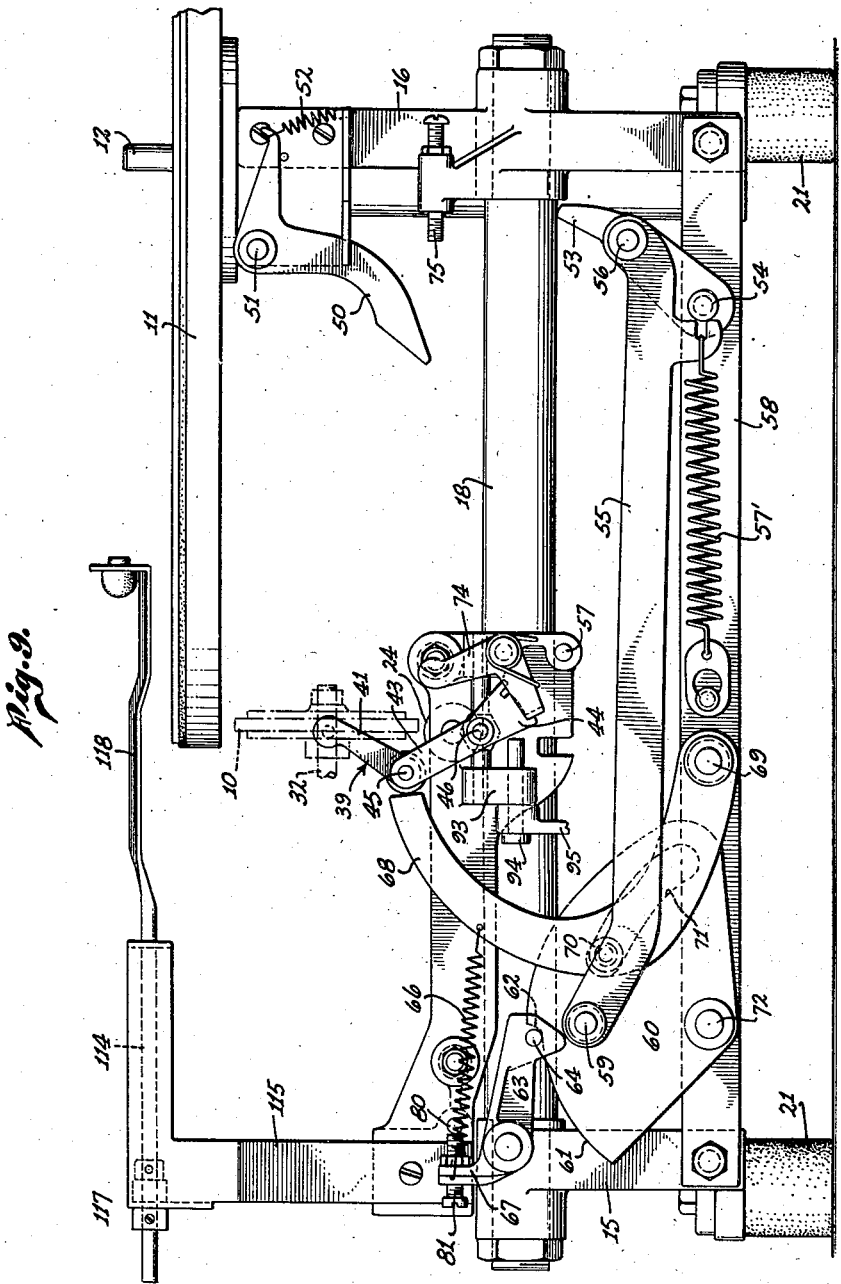
Fig. 9 is a front elevation showing the arrangement of the elements immediately prior to the resetting of the carriage into the position indicated in Fig. 6.

The lead nut lever 91 also carries means for controlling a tone arm. Such means include the link 110, the lever 111 and the link 112, the link 112 being connected at its upper end to another link 113 pivotally connected as at 114 to the upper end of a tone arm rest 115 attached to the carriage 9. The pivotal connection between the links 112 and 113 includes a pin 116 which is adapted to raise an arm 117 attached to the rod 114, such rod being deformed into a lifting cam 118 as illustrated in Figs. 9, 10 and 11. It will be evident that any upward motion of the link 112 will cause the pin 116 to raise the lever 117 and the tone arm lifting crank 118 but downward motion of the link 112 does not positively move the tone arm lifting crank 118 but instead permits such crank to move downwardly under the force of gravity.

Figure 2:
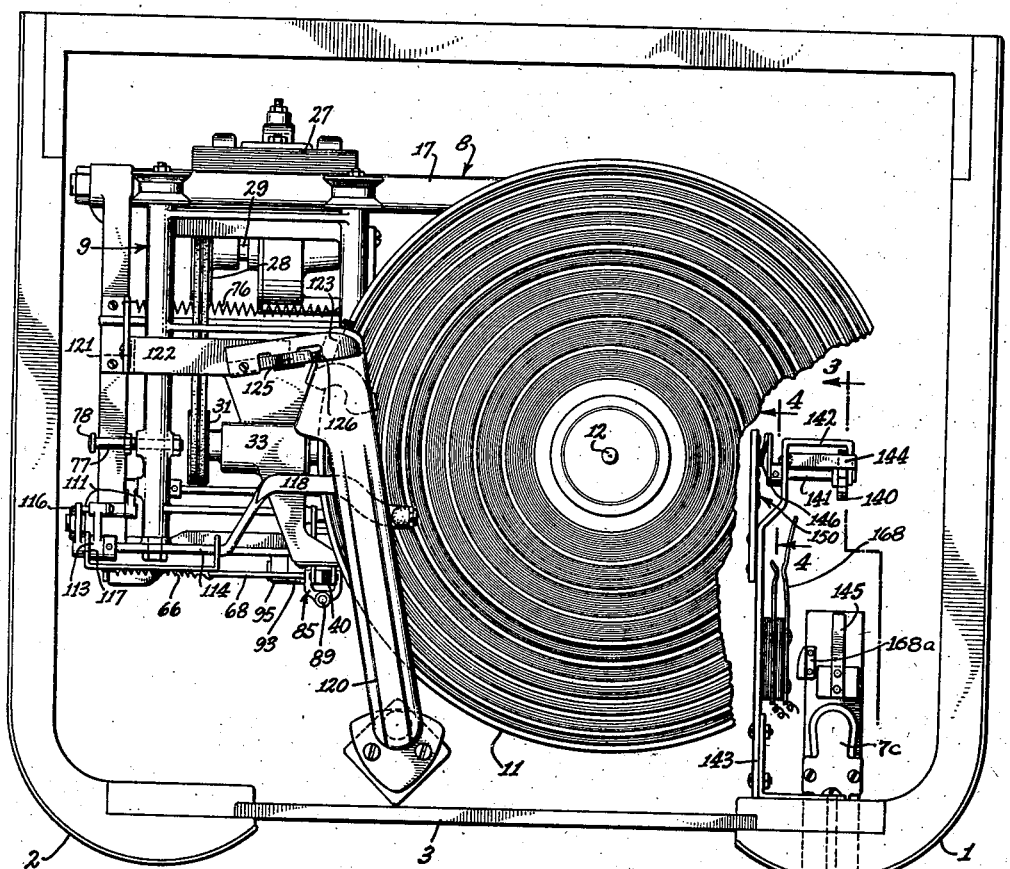
Fig. 2 is a plan view of the apparatus and housing with the cover removed, a portion of the turntable being broken away.

The tone arm itself, indicated at 120, may be attached to the housing of the entire device or mounted upon the carriage 8. In Fig. 2 the tone arm 120 is shown pivotally attached to the housing. In order to properly position the stylus of the tone arm and assure that such stylus will contact the record held by the turn-table 11 at a precisely located point, the frame 8 of the device may be provided with an upstanding member 121 having a horizontally extending portion 122, such horizontally extending portion being provided with a downwardly curving tip 123 (best shown in Fig. 10). A transversely extending opening or slot is formed part way through the member 123, the material being bent down out of the member 123 so as to form the downwardly extending curved tip 124.

A shock spring 125 may be carried by the member 122 and extended downwardly so as to form a funnel with the tip 124. The tone arm 120 may be provided with an upwardly extending hook member 126 which, when the tone arm is brought back toward the outer limit of travel, first engages with the curved end 123 and assumes the position shown in dotted lines in Fig. 10 and then slides upwardly until the prong of the member 126 enters the funnel made by the shock spring 125 and the lip 124. Accurate positioning of the stylus carried by the tone arm is thus obtained, the tone arm lifting the crank 118 receiving the tone arm and depositing it upon the record 119 carried by the table 11. At this point it may be mentioned that it has been found desirable to introduce vibration-absorbing material in the form of discs, strips or a sheet between the turn-table 11 and the record 119 for the purpose of absorbing any vibration which may exist in the turn-table.

In some forms of device it has also been found desirable to use a stop shock bumper rod 130 extending between the end castings 15 and 16 and carrying a stop 131 which is contacted by the movable carriage 9 at the time that the carriage stop pin and latch 77, 79 engage. The rod 130 may extend through a stuffing box filled with resilient material 132 capable of being compressed by any adjustable member 133 carried by the rod 130.

Figure 3:
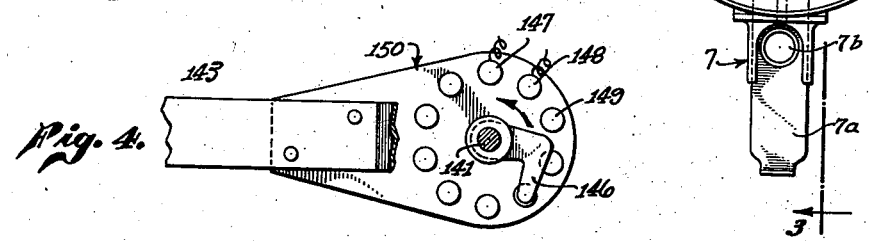
Fig. 3 is a vertical section of the coin slot and correlated apparatus taken along the plane 3—3 of Fig. 2.
Figure 4:
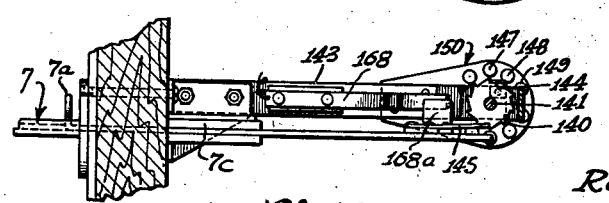
Fig. 4 is an enlarged vertical section taken along the plane 4—4 of Fig. 2.

Details of construction of the coin slot 7 need not be described since any suitable coin slot may be used. The coin slot illustrated consists of a slide 7a having an opening 7b for the reception of a coin, the movement of the slide beyond a predetermined point being prevented by appropriate locking devices illustrated generally at 7c unless the proper coin is in place in the opening. Such locking devices also normally include ratchet means for preventing full or partial return of the slide until the full stroke is completed. In the form of device shown, a ratchet 140 is mounted upon a shaft 141 journaled in a U-shaped bracket 142 carried by a member 143 (see Figs. 2, 3 and 4) extending from the front of the housing and adjacent the coin slot 7. A stop spring 144 cooperates with the pawl 140 so as to permit a step by step rotation of the pawl 140 under the influence of a pusher 145 carried by the movable element of the coin slot, the pusher 145 engaging with the pawl so as to partially rotate the same at the end of the stroke of said pawl. Mounted upon the shaft 141 is a brush arm 146 adapted to cooperate with a number of terminals 147, 148, 149, etc., and constituting a step switch 150.

Figure 16:
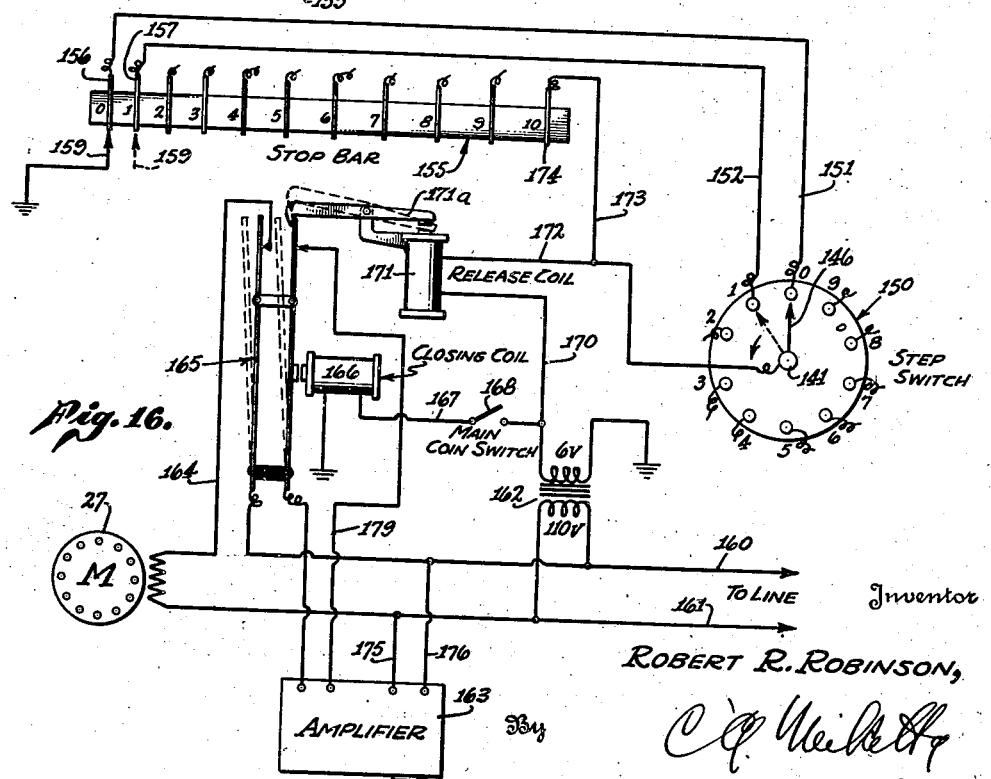
Fig. 16 is a wiring diagram illustrating the mode of operation of the apparatus.

By referring to Fig. 16, the brush arm just described is indicated at 146 and the step switch is indicated at 150. The various terminals 147—149 are connected by suitable leads, such as the leads 151, 152 to contacts 156, 157, etc., carried by a stop bar 155 which is positioned between the end castings 15 and 16. A movable brush arm 159 is carried by the motor carriage 9 and as clearly shown in Figs. 13 and 14 is attached to the lead nut lever 91. The stop bar 155 is preferably made of insulating material, the various terminals 156, 157, etc., being made of metal, the brush arm 159 being preferably made of a resilient strip of conducting metal such as phosphor bronze.

It is to be noted that the brush arm 159 will contact with the various terminals 156, 157, etc., of the stop bar during movement of the motor carriage from its outer limit of travel toward the rotational axis of the turn-table and while under the influence of the lead screw 13. When the lead nut lever 91 is disengaged from the lead screw 13, the brush 159 moves away from the various terminals 156, 157, etc., so that when the movable carriage 9 is returning to its outer limit of travel under the influence of the spring 76, the brush arm 159 does not contact with the terminals of the stop bar 155.

By again referring to Fig. 16, it will be noted that current from a suitable source is supplied by the lines 160, 161. A step down transformer, indicated at 162, is supplied with current from the supply lines. An amplifier, generally indicated at 163, is also supplied with current from the line. The motor 27 is also supplied by the line 161, the return line, indicated at 164, leading to a relay generally indicated at 165 having the coil 166 supplied with energy through a line 167 leading to the transformer 162 and including the main coin switch 168. The low side of the transformer 162 is also connected as by line 170 to a release coil 171 of the relay 165, the other side of the release coil, indicated at 172, leading to the shaft 141 of the step switch and to the brush arm 146. A latch 171a associated with the release coil 171 serves to ordinarily lock the relay 165 in contact closing position until reenergization of the release coil 171 releases the latch causing relay 165 to open due to the resiliency of its contact members. A branch line 173 also leads to a safety contact 174 on the stop bar.

The leads 175, 176 leading to the amplifier 163 from the supply lines 160, 161 represent supply of current to a portion only of the amplifier 163 for the purpose of maintaining the amplifier in a preheated or ready condition. Ordinarily the leads 175 and 176 furnish current to the rectifier tubes of the amplifier 163 whereas the circuit closed by the closing coil 166 of the relay 165 and including the lead 179 supplies B current or current on the high potential side of the amplifier. In the position shown in Figure 3 the slide 7a has been moved to its full stroke and has thus closed the main switch 168 and advanced the step switch brush arm 146 which presupposes that the proper coin was inserted prior to the operation of the slide.

Supposing the device to have previously stopped in the position shown in full lines Fig. 16, operation of the electrical circuit illustrated is as follows: Manual operation of the coin slide 7a upon insertion of the proper coin causes the pusher 145 to engage the ratchet 140 close to the end of its stroke (and subsequent to the discharge of the coin from the slide 7a), rotating the arm 146 to the position shown dotted, breaking the circuit through the release coil (through line 170 from transformer 162, line 172, shaft 141, arm 146, line 151, contact 156, and brush 159 to ground) and connecting one side of the transformer 162 to line 152 through the release coil 171. However, the circuit through line 152 is incomplete so the latch 171a may drop into position to engage the contacts of the relay 165.

During the motion of the coin slide 7a and immediately subsequent to movement of the arm 146 off the contact connected to the lead 151, momentary closure of switch 168 is effected by a suitable lug 168a on the slide 7a, energizing the closing coil 166 to close relay 165 and thus close the circuit through motor 27 and amplifier 163. Relay 165 is locked closed by the latch 171a until operation of the device moves brush 159 into contact with the contact 157, whereupon the circuit is again closed through release coil 171. This releases relay 165, opening the contacts until a subsequent operation of the coin slide 7a again breaks the release coil circuit by movement of the arm 146 to subsequent contacts of the step switch.

It will be seen that each insertion of a coin advances the step switch arm 146 one contact and that the motor will continue to run until brush arm 159 touches the particular contact on the stop bar 155 which is connected to the contact of the step switch in contact with brush arm 146. It is only at this time that the release coil is energized to break the motor circuit. The device may thus be played continuously without stopping so long as the arm 146 is, by the insertion of successive coins, kept advanced beyond the corresponding position of the brush arm 159.

It will be understood that the circuit illustrated is elementary and that many refinements therein may be made by one skilled in the art without departing from the operating principle thereof.

It will thus be seen that the device hereinabove described includes, in combination with a turntable, a lead screw and a motor carriage movable along said lead screw, means whereby a plurality of recordings may be successively played whenever a coin slot mechanism is actuated. In the event more than one coin is introduced into the coin slot, the device will continue to play successive recordings until the brush arm 159 makes connection with a contact on the stop bar 155 which is connected to a circuit closed by the step switch, the step switch being actuated by the coin receiving slot. In this manner, if three coins were introduced in rapid succession, three successive tunes would be played by the device.

Furthermore, the apparatus of this invention includes means whereby the carriage is automatically returned to initial starting position and prevented from rebounding by the latch means 77, 78, 79. In this manner the carriage is positioned for pressure engagement of the lead nut lever with the lead screw. Means, controlled by the lead screw, are also provided for predetermining the position of engagement between the lead nut lever and the lead screw so that engagement of the lead nut lever with the lead screw takes place only at a predetermined position with the threads coinciding exactly. Since the movement of the lead nut lever controls the release of the tone arm, the tone arm will contact with the record disc at a precise groove or point, thereby assuring proper initiation of reproduction of the first recording of a series whenever the motor carriage returns to its initial position and replaying of the tunes is desired, and assuring subsequent accurate timing.

The link connection 87 with its yielding spring 90 places the lead nut lever in condition to engage the lead screw subject, however, to release by the control means or control cam 101. The combination of the toggle arrangement supporting the end of lever arm 33 together with the yielding linkage previously mentioned permits the friction disc 10 to engage with the turn-table 11 (when the motor carriage returns to outer limit of travel) and thereby slow down the rotational speed of the table and permit a positive drive to be imparted to the lead screw even though the lead nut lever is not in engagement with the lead screw. The engagement of the friction disc with the turn-table at this stage of the operation thereby provides a positive drive for the purpose of permitting the lead screw to drive the control cam 101.

Although a particular form of device has been described heretofore, those skilled in the art will appreciate that a number of changes and modifications can be made without departing from the spirit of this invention. Certain modifications are illustrated in Figs. 17 to 20. As there shown, the lever arm 33 is provided with an auxiliary lever 35 and a supporting toggle 39 is employed similar to that previously described. The yielding yoke connection between the auxiliary lever 35 and the lead nut lever 91 differs, however, in that the upper end of the toggle 39 at its point of connection with the auxiliary lever 35 is provided with a pair of links 180 and 181 connected together as at 182 to a link 183 pivotally connected as at 184 to the end of the lead nut lever 91. A pin 185 is carried by the link 183, the pin 185 extending through a slot 186 formed in a member 187 connected to the upper end of the toggle 39. A tension spring 188 connects the lever 91 with the member 187 so that when the toggle 39 is broken, the downward motion of the upper end of the toggle 39 is transmitted by member 187 and pin 185 to the link 183 and to the lead nut lever 91, thereby causing such lead nut lever to disengage the nut from the lead screw. When, however, the toggle 39 is straightened, the spring 188 is placed under tension, thereby placing the lead nut lever 91 in condition to engage with the lead screw, subject, however, to the action of the control cam 101 and cam lever 95 which is linked with the lever 91 by means of the pin 97 and the slot 96.

Attention is also called to the fact that in the modified form the motor is suspended by shock-absorbing and vibration-dampening means so as to prevent any vibration from being transmitted to the reproducing mechanism. It will be noted that the roller 22 still supports a motor carriage 9 but that said motor carriage includes a transverse metal member 190 having apertures therein, said apertures being covered by means of metal frames 191, such frames containing rubber discs 192 having relatively thick central portions adapted to receive the studs 193 which are attached to hanger straps 194 to which the motor 27 is attached. The discs 192 include a thin annular section surrounding the central boss and relatively thick flanges which grip the inside edges of the openings formed in the plates 191. The plates 191 are attached to the metal member 190 in any suitable manner as, for example, by means of the screws 195. The entire motor 27 may be suspended from two of such resilient discs 192 and it will be noted that swinging as well as vertical movement of the motor 27 can take place without imparting any movement to the motor carriage 9 per se.

In the original form of device illustrated the tone arm 120 was shown pivoted from a stationary support attached to the housing. In the modification illustrated in Figs. 17 to 20, the tone arm 120' is shown mounted upon a horizontally extending rod 200 carried by the tone arm rest 115. This horizontally extending shaft or bar 200 preferably parallels the lead screw 13 and the tone arm 120' is sufficiently short so as to permit the stylus thereof to contact the record carried by the table 11 at a point immediately above the point of contact between the friction disc 19 and the bottom of the table 11. The tone arm is thus carried by the carriage and although free to move vertically and horizontally to some extent, will move in a straight line radially of the table and not in an arc as the tone arm 120 previously described.

It is to be also noted that in order to prevent transmission of vibrations from the carriage or tone arm support 115 to the tone arm 120', suitable vibration-dampening means may be introduced between shaft 200 and the tone arm 120'. For example, the tone arm 120' may be provided with bifurcated end portions 201 and 202 having bores exceeding in diameter the diameter of the guide rod 200. A felt cylinder having outwardly flaring washer-like ends 203 and 204 may then be inserted between the bifurcated end portions 201 and 202 and the guide rod 200. A member 122 similar to that previously described may be carried by the frame of the device for the purpose of facilitating the precise location at which the tone arm 120' is permitted to drop into contact with the record on the turn-table.

It is to be understood that although a specific embodiment of the invention has been described, numerous modifications and changes can be made without departing from the present invention. For example, the latching means for holding the carriage at its outer limit of travel need not include the specific elements hereinbefore described, such as the latch means 77, 78, 79. Other latch means may be provided, such as, for example, latch means carried by the lead nut lever so that motion of the lead nut lever into engagement with the screw 13 releases the latch. The particular form of tone arm support and guide is not essential and other forms may be used interchangeably therewith. All changes and modifications coming within the scope of the appended claims are embraced thereby.

I claim:

1. In a phonograph including a turn-table, a lead screw driven by the turn-table and a motor carriage movable along said lead screw, the combination of: a lever arm pivotally connected to the carriage, said arm carrying a friction disc adapted to make driving contact with the turn-table, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; means for moving said lever arm and lead nut lever to disengage said disc and nut, at the inner limit of travel of the carriage; means for resetting said lever arm when said carriage is at its outer limit of travel; and means for moving said lead nut lever to engage the nut carried thereby with the lead screw at a controlled point of said lead screw only.

2. In a phonograph including a turn-table, a lead screw driven by the turn-table, and a motor carriage movable along said lead screw, the combination of: a lever arm pivotally connected to the carriage, said arm carrying a friction disc adapted to make driving contact with the turn-table, a motor on said carriage, and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; means for moving said lever arm and lead nut lever to disengage said disc and nut, at the inner limit of travel of the carriage; means actuated by the movement of said carriage for automatically resetting said lever arm when said carriage is at its outer limit of travel; and means controlled by said lead screw for moving said lead nut lever to engage the nut carried thereby with the lead screw at a controlled point only.

3. In a phonograph including a turn-table, a lead screw driven by the turn-table, and a motor carriage movable along said lead screw, the combination of: a lever arm pivotally connected to the carriage, said arm carrying a friction disc adapted to make driving contact with the turn-table, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; a tone arm support, provided with a tone arm, carried by the motor carriage; and means releasable by the carriage at the inner limit of travel thereof for moving said lever arm, lead nut lever and tone arm support to disengage said friction disc and nut and raise said tone arm.

4. In a phonograph including a turn-table, a lead screw driven by the turn-table, and a motor carriage movable along said lead screw, the combination of: a lever arm pivotally connected to the carriage, said arm carrying a friction disc adapted to make driving contact with the turntable, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; a tone arm support, provided with a tone arm, carried by the motor carriage; means releasable by the carriage at the inner limit of travel thereof for moving said lever arm, lead nut lever and tone arm support to disengage said friction disc and nut and raise said tone arm; and means actuated by the return of the carriage to its outer limit of travel for resetting said lever arm, for moving said lead nut lever to engage the nut carried thereby with the lead screw, and for lowering the tone arm.

5. In a phonograph including a turn-table, a lead screw driven by the turn-table, and a motor carriage movable along said lead screw, the combination of: a lever arm pivotally connected to the carriage, said arm carrying a friction disc adapted to make driving contact with the turntable, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; a tone arm pivotally supported to move over the turn-table; means releasable by the carriage at the inner limit of travel thereof for moving said lever arm, lead nut lever and tone arm to disengage said friction disc and nut and raise said tone arm; means actuated by the return of the carriage to its outer limit of travel for resetting said lever arm and engaging the friction disc carried thereby with the turn-table; and means controlled by the lead screw for moving said lead nut lever to engage the nut carried thereby with the lead screw and for lowering the tone arm at a controlled point only of said lead screw.

6. In a phonograph including a turn-table, a lead screw driven by the turn-table, and a motor carriage movable along said lead screw, the combination of: a lever arm pivotally connected to the carriage, said arm carrying a friction disc adapted to make driving contact with the turntable, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; latch means for holding said carriage at its outer limit of travel; means actuated by movement of the carriage to its inner limit of travel for moving said lever arm and lead nut lever to disengage said disc and nut; means actuated by the return of the carriage to its outer limit of travel for resetting said lever arm and for moving said lead nut lever to engage the nut carried thereby with the lead screw; and means actuated by the last named movement of the lead nut lever for unlatching said carriage latch.

7. In a machine adapted to play one or more recordings from a disc record bearing a plurality of recordings and including a turn-table, a lead screw driven by the turn-table, and a motor carriage movable along said lead screw, the combination of: a lever arm pivotally connected to the carriage, said arm carrying a friction disc adapted to make driving contact with the turntable, a motor on said carriage, and a driving connection between said motor and said friction disc; a toggle attached to said carriage and adapted to support the movable end of said lever arm; a lead nut lever pivotally connected to said carriage, said lever carrying a nut adapted to engage the lead screw to move the carriage to its inner limit of travel; a yielding connection between the movable end of said lead nut lever and said lever arm; spring means for moving the carriage to its outer limit of travel; means for breaking said toggle and moving said lever arm and lead nut lever to disengage said disc and nut, said means becoming operative when the carriage is at its inner limit of travel; and means for resetting said toggle and lever arm when the carriage is at its outer limit of travel.

8. In a machine adapted to play one or more recordings from a disc record bearing a plurality of recordings and including a turn-table, a lead screw driven by the turn-table, and a motor carriage movable along said lead screw, the combination of: a lever arm pivotally connected to the carriage, said arm carrying a friction disc adapted to make driving contact with the turntable, a motor on said carriage and a driving connection between said motor and said friction disc; a toggle attached to said carriage and adapted to support the movable end of said lever arm; a lead nut lever pivotally connected to said carriage, said lever carrying a nut adapted to engage the lead screw to move the carriage to its inner limit of travel; a yielding connection between the movable end of said lead nut lever and said lever arm; spring means for moving the carriage to its outer limit of travel; means for breaking said toggle and moving said lever arm and lead nut lever to disengage said disc and nut, said means becoming operative when the carriage is at its inner limit of travel; means for resetting said toggle when the carriage is at its outer limit of travel, and means for latching the carriage when it reaches its outer limit of travel prior to resetting of said toggle.

9. In a machine adapted to play one or more recordings from a disc record bearing a plurality of recordings and including a turn-table, a lead screw driven by the turn-table, and a motor carriage movable along said lead screw, the combination of: a lever arm pivotally connected to the carriage, said arm carrying a friction disc adapted to make driving contact with the turntable, a motor on said carriage and a driving connection between said motor and said friction disc; a toggle attached to said carriage and adapted to support the movable end of said lever arm; a lead nut lever pivotally connected to said carriage, said lever carrying a nut adapted to engage the lead screw to move the carriage to its inner limit of travel; a yielding connection between the movable end of said lead nut lever and said lever arm; spring means for moving the carriage to its outer limit of travel; means actuated by the carriage at its inner limit of travel for breaking said toggle and moving said lever arm and lead nut lever to disengage said disc and nut; and means actuated by the carriage at its outer limit of travel for resetting said toggle and lever arm.

10. In a phonograph adapted to play one or more recordings from a disc record bearing a plurality of recordings, said phonograph including a turn-table for said disc, a lead screw driven by the turn-table, and a motor carriage movable along said lead screw, the combination of: a stop bar paralleling the direction of movement of said carriage, a plurality of spaced contacts on said stop bar, said contacts bearing a predetermined relation to the recordings on said disc; a brush arm on said carriage and in operative relation to the spaced contacts on said stop bar; and an electrical circuit including a coin-actuated switch adapted to energize the motor, said electrical circuit being adapted to deenergize the motor when said brush arm makes connection with the contact on said stop bar; a lever arm pivotally connected to the carriage, said arm carrying a friction disc adapted to make driving contact with the turn-table, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; a tone arm pivotally carried by the motor carriage; and means releasable by the carriage at the inner limit of travel thereof for moving said lever arm, lead nut lever and tone arm to disengage said friction disc and nut and raise said tone arm.

11. In a phonograph adapted to play one or more recordings from a disc record bearing a plurality of recordings, said phonograph including a turn-table for said disc, a lead screw driven by the turn-table, and a motor carriage movable along said lead screw, the combination of: a stop bar paralleling the direction of movement of said carriage, a plurality of spaced contacts on said stop bar, said contacts bearing a predetermined relation to the recordings on said disc; a brush arm on said carriage and in operative relation to the spaced contacts on said stop bar; and an electrical circuit including a coin-actuated switch adapted to energize the motor, said electrical circuit being adapted to deenergize the motor when said brush arm makes connection with a contact on said stop bar; a lever arm pivotally connected to the carriage, said arm carrying a friction disc adapted to make driving contact with the turn-table, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; a tone arm movable over the turn-table; means releasable by the carriage at the inner limit of travel thereof for moving said lever arm, lead nut lever and tone arm to disengage said friction disc and nut and raise said tone arm; and means actuated by the return of the carriage to its outer limit of travel for resetting said lever arm, for moving said lead nut lever to engage the nut carried thereby with the lead screw, and for lowering the tone arm support.

12. In a phonograph adapted to play one or more recordings from a disc record bearing a plurality of recordings, said phonograph including a turn-table for said disc, a lead screw driven by the turn-table, and a motor carriage movable along said lead screw, the combination of: a stop bar paralleling the direction of movement of said carriage, a plurality of spaced contacts on said stop bar, said contacts bearing a predetermined relation to the recordings on said disc; a brush arm on said carriage and in operative relation to the spaced contacts on said stop bar; and an electrical circuit including a coin-actuated switch adapted to energize the motor, said electrical circuit being adapted to deenergize the motor when said brush arm makes connection with a contact on said stop bar; a lever arm pivotally connected to the carriage, said arm carrying a friction disc adapted to make driving contact with the turn-table, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; a tone arm pivotally movable over said turn-table; means releasable by the carriage at the inner limit of travel thereof for moving said lever arm, lead nut lever and tone arm to disengage said friction disc and nut and raise said tone arm; means actuated by the return of the carriage to its outer limit of travel for resetting said lever arm and engaging the friction disc carried thereby with the turn-table; and means controlled by the lead screw for moving said lead nut lever to engage the nut carried thereby with the lead screw and for lowering the tone arm at a controlled point only of said lead screw.

13. In a phonograph adapted to play one or more recordings from a disc record bearing a plurality of recordings, said phonograph including a turn-table for said disc, a lead screw driven by the turn-table, and a motor carriage movable along said lead screw, the combination of: a stop bar paralleling the direction of movement of said carriage, a plurality of spaced contacts on said stop bar, said contacts bearing a predetermined relation to the recordings on said disc; a brush arm on said carriage and in operative relation to the spaced contacts on said stop bar; and an electrical circuit including a coin-actuated switch adapted to energize the motor, said electrical circuit being adapted to deenergize the motor when said brush arm makes connection with a contact on said stop bar; a lever arm pivotally connected to the carriage, said arm carrying a friction disc adapted to make driving contact with the turn-table, a motor on said carriage and a driving connection between said motor and said friction disc; a lead nut lever pivotally connected to said carriage, said lever carrying a nut adapted to engage the lead screw to move the carriage to its inner limit of travel; spring means for moving the carriage to its outer limit of travel; latch means for holding said carriage at its outer limit of travel; means actuated by movement of the carriage to its inner limit of travel for moving said lever arm and lead nut lever to disengage said disc and nut; means actuated by the return of the carriage to its outer limit of travel for resetting said lever arm and for moving said lead nut lever to engage the nut carried thereby with the lead screw; and means actuated by the last named movement of the lead nut lever for unlatching said carriage latch.

14. In a phonograph adapted to play one or more recordings from a disc record bearing a plurality of recordings, said phonograph including a turn-table for said disc, a lead screw driven by the turn-table and a motor carriage movable along said lead screw, the combination of: a lead nut lever pivotally connected to said carriage, said lever carrying a nut adapted to engage the lead screw to move the carriage; a lever arm pivotally connected to the carriage, said lever arm carrying a friction disc adapted to make driving contact wtih the turn-table; a toggle supporting the free end of said lever arm, a yielding linkage between the free end of said lever arm and the end of said lead nut lever; and means controlled by the lead screw for predetermining the position of engagement between the nut and the lead screw, said yielding linkage being adapted to permit said lever arm to move upwardly and contact the friction disc carried thereby with said turn-table and place the lead nut lever in condition to engage the nut with said lead screw subject to release by the control means.

15. In a coin operated phonograph including a turn-table, a lead screw driven by the turn-table, and a motor carriage movable along said lead screw, the combination of: a lever arm pivotally connected to the carriage, such lever arm carrying a friction disc adapted to make driving contact with the turn-table; a motor on said carriage, and a driving connection between said motor and said friction disc; and a lead nut lever pivotally connected to said carriage, said lever carrying a nut adapted to engage the lead screw to move the carriage to its inner limit of travel; spring means for moving the carriage to its outer limit of travel; latch means for holding the carriage when it returns to its outer limit of travel; and means controlled by the return of the carriage to its inner limit of travel for moving said lead nut lever to engage the nut carried thereby with the lead screw.

16. In a phonograph adapted to play recordings from a disc record, said phonograph including a turn-table for said disc, a lead screw driven by the turn-table, and a motor carriage movable along said lead screw, the combination of: spring means tending to return the carriage to its outer limit of travel, a lead nut lever pivotally connected to said carriage, said lever carrying a nut adapted to engage the lead screw to move the carriage to its inner limit of travel, a tone arm movable over the turn-table, a stationary locating device for guiding said tone arm into position at its outer limit of travel, and cam means driven by said lead screw for lowering the tone arm through said locating device into contact with the disc and for engaging the lead nut with the lead screw simultaneously and at a predetermined point of said lead screw.

17. In a phonograph adapted to play recordings from a disc record, said phonograph including a turn-table for said disc, a lead screw driven by the turn-table, and a motor carriage movable along said lead screw, the combination of: a lever arm pivotally connected to the carriage, said arm carrying a friction disc adapted to make driving contact with the turn-table, a motor on said carriage and a driving connection between the said motor and said friction disc; a lead nut lever pivotally connected to said carriage, said lever carrying a nut adapted to engage the lead screw to move the carriage to its inner limit of travel; spring means tending to return the carriage to its outer limit of travel; a tone arm movable over a disc on said turn-table; means releasable by the carriage at the inner limit of travel thereof for moving said lever arm, lead nut lever and tone arm to disengage said friction disc and nut and raise said tone arm; and cam means driven by said lead screw for lowering the tone arm into contact with the disc and for engaging the lead nut with the lead screw simultaneously and at a predetermined point of said lead screw.

ROBERT R. ROBINSON.